(12) United States Patent
Stegmann

(10) Patent No.: US 11,971,264 B2
(45) Date of Patent: Apr. 30, 2024

(54) METHOD AND DEVICE FOR DETERMINING A ROUTE FOR A VEHICLE

(71) Applicant: ZF Friedrichshafen AG, Friedrichshafen (DE)

(72) Inventor: Henrik Stegmann, Stemwede (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 220 days.

(21) Appl. No.: 17/617,963

(22) PCT Filed: Mar. 5, 2020

(86) PCT No.: PCT/EP2020/055796
§ 371 (c)(1),
(2) Date: Dec. 10, 2021

(87) PCT Pub. No.: WO2020/249273
PCT Pub. Date: Dec. 17, 2020

(65) Prior Publication Data
US 2022/0357169 A1    Nov. 10, 2022

(30) Foreign Application Priority Data
Jun. 13, 2019 (DE) ............... 10 2019 208 588.1

(51) Int. Cl.
*G01C 21/34* (2006.01)
(52) U.S. Cl.
CPC ................ *G01C 21/3461* (2013.01)
(58) Field of Classification Search
CPC .................................. G01C 21/3461
See application file for complete search history.

(56) References Cited

U.S. PATENT DOCUMENTS

| 2010/0049397 A1* | 2/2010 | Liu | G01C 21/3469 701/31.4 |
| 2015/0170515 A1* | 6/2015 | Annapureddy | G01C 21/3492 701/482 |
| 2018/0154907 A1* | 6/2018 | Hecht | G08G 1/096838 |
| 2018/0238702 A1* | 8/2018 | Liebinger | G01C 21/3461 |
| 2018/0335309 A1* | 11/2018 | Pan | G01C 21/3453 |

(Continued)

FOREIGN PATENT DOCUMENTS

| DE | 102 12 997 A1 | 10/2003 |
| DE | 103 11 516 A1 | 9/2004 |

(Continued)

OTHER PUBLICATIONS

German Office Action Corresponding to 10 2019 208 588.1 dated Jan. 20, 2020.

(Continued)

*Primary Examiner* — Seth A Silverman
(74) *Attorney, Agent, or Firm* — Finch & Maloney PLLC

(57) ABSTRACT

A method for determining a route (100) for a vehicle. When selecting a route segment (110, 112) of the route (100), a condition value assigned to the route segment (110, 112) and a default value associated with the route (100) are taken into account. The condition value represents a road condition of the route segment (110, 112) and the default value represents a road quality that is preferred for the route (100) and is independent of a road category.

10 Claims, 3 Drawing Sheets

(56) References Cited

U.S. PATENT DOCUMENTS

2019/0056232 A1\* 2/2019 Wang .................... H04W 24/08
2019/0378059 A1\* 12/2019 Levy ...................... G06Q 50/40
2021/0190519 A1 6/2021 Blumentritt et al.

FOREIGN PATENT DOCUMENTS

| DE | 10 2007 037 329 A1 | 2/2008 |
| DE | 10 2017 200 695 A1 | 7/2018 |
| DE | 10 2017 203 331 A1 | 9/2018 |
| DE | 10 2017 220 094 A1 | 5/2019 |
| DE | 11 2009 005 342 B4 | 6/2019 |
| JP | 2000-074682 A | 3/2000 |
| JP | 2017-020859 A | 1/2017 |

OTHER PUBLICATIONS

International Search Report Corresponding to PCT/EP2020/055796 dated May 20, 2020.
Written Opinion Corresponding to PCT/EP2020/055796 dated May 20, 2020.

\* cited by examiner

METHOD AND DEVICE FOR DETERMINING A ROUTE FOR A VEHICLE

This application is a national stage completion of PCT/EP2020/055796 filed Mar. 3, 2020 which claims priority from German Application Serial No. 10 2019 208 588.1 filed Jun. 13, 2019.

FIELD OF THE INVENTION

The present invention relates to a method and a device for determining a route for a vehicle.

BACKGROUND OF THE INVENTION

Navigation systems for road traffic applications calculate their route on the basis of traffic guidance systems and, if necessary, traffic information.

DE 10 2017 203 331 A1 relates to the adjustment of the dampers of a vehicle as a function of location information.

SUMMARY OF THE INVENTION

Against that background, the present invention provides a better method and an improved device for determining a route for a vehicle, in accordance with the principal claims. Advantageous design features emerge from the subordinate claims and from the description that follows.

Advantageously, when determining a route the quality and nature of road conditions, and therefore the driver's comfort, can be taken into account.

In a method for determining a route for a vehicle, when selecting a route segment of the route a condition value associated with the route segment and a default value associated with the route are taken into account. In this, the condition value represents a road condition of the route segment and the default value represents a road quality preferred for the route and independent of a road category.

The method can be part of a navigation system in which, beginning at a starting point, a route to an end point is determined. For this, various route segments between the starting point and the end point can be considered and selected by taking into account specified selection criteria and used in the route. A route segment can be stored as a path running between two nodes or as a vector in a digital map. The route between the starting point and the end point can consist of a route segment or a plurality of route segments. A route criterion can relate, for example, to a stretch of road or to a driving time. To determine the route, one can have recourse to determination methods known in connection with navigation applications. According to this approach, a road quality is taken into account as a route criterion. For this the road quality is independent of the road category, which therefore applies regardless of whether, for example, a route segment leads along a motorway, a country road or an unsurfaced road. The road quality is the better, the fewer are the road excitations acting on the vehicle road while driving on a road which is part of the route segment. A road excitation is, for example, caused by driving over an uneven patch or a pothole, and can result in an acceleration of the vehicle in the direction of its vertical axis. The road quality preferred for driving along the route can be specified by the default value. At least one condition value can be associated with each route segment, which value can characterize the road condition of the route segment as regards road excitations expected to act upon the vehicle as it drives along the route segment concerned. Depending on the determination method used for determining the route, between two possible alternative route segments the one can be chosen which corresponds to, or comes closest to, the road quality indicated by the default value. Alternatively, a route segment corresponding to a further route criterion can be sought first, and then it can be checked whether the route segment fulfills the preferred road quality. If it does not, then an alternative route segment can be sought and checked. For this, known comparison methods or selection methods can be used.

In selecting the route segment, the condition value and the default value can be taken into account by comparing the condition value with the default value. For this, the condition value and the default value can have matching formats. For example, the condition value can indicate a good road condition when the condition value is set at a first value. Correspondingly, the default value can indicate a good preferred road quality when the default value is set at the first value. Correspondingly, the condition value can indicate a poor road condition when the condition value is set at a second value and the default value can indicate a poor preferred road quality when the default value is set at the second value. In this way, it can be checked very simply and quickly whether a potential route segment between the starting and the end points does or does not come up to the preferred road quality.

The route segment can be selected from a number of route segments. The said number can include a first route segment and at least one second route segment alternative to the first route segment. In this, a first condition value can be assigned to the first route segment, which value represents a road condition of the said first route segment, and a second condition value can be assigned to the second route segment, which value represents a road condition of the said second route segment. In that case the selection of the route segment can take into account the first condition value, the second condition value and the default value by virtue of a comparison between the first condition value, the second condition value and the default value. The first route segment and the second route segment can have a common starting node and a common end node. Then, the first route segment and the second route segment can follow completely different paths or they can partially overlap. In that way, from a plurality of available route segments the best one from the standpoint of the preferred road quality can be selected.

For example, the first route segment can be chosen as the route segment when the road condition represented by the first condition value is closer to the road condition represented by the default value than is the road condition represented by the second condition value. Correspondingly, the second route segment can be chosen as the route segment when the road condition represented by the second condition value is closer to the road condition represented by the default value than is the road condition represented by the first condition value. For comparing the condition values with the default value that represents the preferred road quality, a suitable comparison protocol can be used. In this, at least one further route criterion can be taken into account. In that way it can be, for example, ensured that the choice of the route segment which is optimum with regard to the preferred road quality does not result in an unacceptable disregard of the further route criterion. Thus, for example, an unacceptable prolongation of the driving time or the driving distance can be avoided.

Correspondingly, when selecting the route segment, the length of the first route segment and the length of the second route segment can be taken into account. For example, instead of the route segment that is optimum as regards the preferred road quality, a less optimal route segment can be chosen if the optimum route segment is considerably longer than the less optimal route segment. For this a suitable threshold value can be specified, which for example relates to a ratio of the lengths of the route segments. A corresponding procedure can also be used in relation to the driving time.

The route segment and the condition value can be read out via a wireless interface from a memory device. The memory device can be located outside the vehicle and, for example, it can be realized as a so-termed Cloud. The route segment and the condition value can be represented by data that form part of a digital map stored in the memory device. If the digital map is stored in a central storage facility, current data can be accessed at any time. Alternatively, the memory device can be located in the vehicle. In that case no permanent radio link is needed.

The default value can be read in by way of an input device, for example, in the form of a man-machine interface. For example, the default value can be input by an occupant of the vehicle via the input device located in the vehicle. In that way the preferences of various occupants or even temporarily varying preferences of a vehicle occupant can be taken into account.

The condition value can be determined by using sensor data that represent data gathered on a chassis of a vehicle by means of sensors. By sensors arranged on a vehicle road excitations acting upon the vehicle can be detected. Advantageously, for this one can have recourse to sensors fitted in a vehicle in any case. The condition value can be associated with the route segment using location data which represent data determined by a position-determining device of the vehicle. Such a position-determining device is designed, for example, to determine the position data with assistance from a satellite. Advantageously, the sensor data can in that way be associated exactly with a route segment. In doing this a travel direction can also be noted. For example, a condition value associated with a particular route segment can be determined by a suitable combination of sensor data detected in relation to the route segment. In that case, for example, detected road excitations can be determined or a maximum detected road excitation can be used to determine the condition value.

The said method can be carried out using a suitable device. A corresponding device for determining a route for a vehicle comprises a selector device which, in order to select a route segment of the route, is designed to take into account a condition value and a default value assigned to the route, the condition value being a road condition of the route segment and the default value being a road quality preferred for the route and independent of a road category.

A device can be an electric unit which processes electric signals, for example sensor signals, and emits control signals as a function of them. The device can have one or more interfaces, which can be in the form of hardware and/or software interfaces. In a hardware design the interfaces can be, for example, part of an integrated circuit in which functions of the device are implemented. The interfaces can also be individual integrated circuits or at least they can consist partially of discrete structural elements. In a software design the interfaces can be software modules, for example present in a microcontroller along with other software modules.

Also advantageous is a computer program product which can be stored on a machine-readable support such as a semiconductor memory, a fixed-plate memory or an optical memory, and is used for carrying out the method in accordance with one of the above-described embodiments when the program is run on a computer or a suitable device.

BRIEF DESCRIPTION OF THE DRAWINGS

An example of the invention will be described in greater detail with reference to the attached drawings, which show.

DETAILED DESCRIPTION OF THE PREFERRED EMBODIMENTS

In the following description of preferred example embodiments of the present invention, the same or similar indexes are used for elements in the various figures that act in a similar way, so that there is no need for repeated descriptions of those elements.

Figure 1:
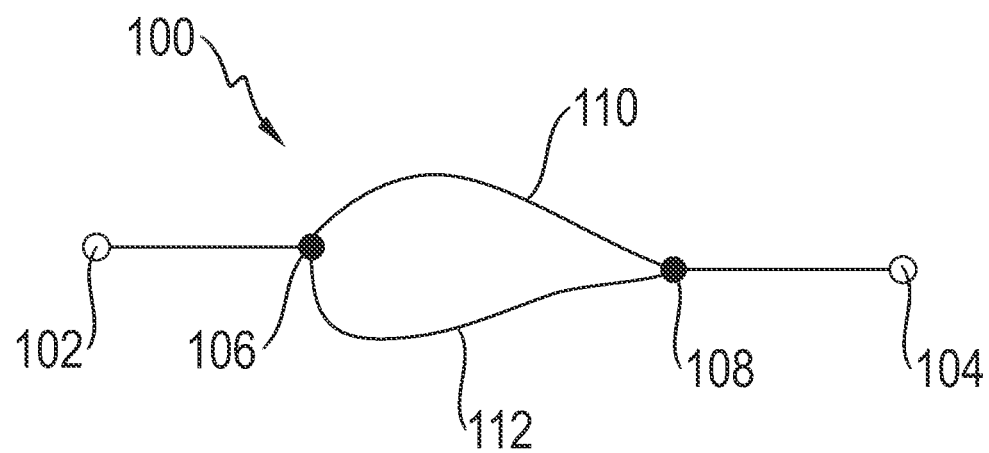
FIG. 1: A schematic representation of a route, according to an example embodiment.

FIG. 1 shows a schematic representation of a route 100 according to an example embodiment. The route 100 leads from a starting point 102 to an end point 104. Only as an example, a first node 106 and a second node 108 are between the starting point 102 and the end point 104. Between the first node 106 and the second node 108, a first route segment 110 or a second rote segment 112 can optionally be selected.

To the first route segment 110 is assigned a first condition value, which represents a road condition of the first route segment 110. A second condition value, which represents a road condition of the second route segment 112, is assigned to the second route segment 112. For example, the first condition value indicates that along the first route segment 110 there are numerous uneven patches which, if the vehicle drives over the first route segment 110, would lead to substantial road excitations acting on the vehicle. In contrast, for example the second condition value indicates that along the second route segment 112 there are only a few uneven patches which, compared with the first route segment 110, would give rise only to slighter road excitations acting upon a vehicle driving along the route segment 112.

For the route 100 a default value is specified, which represents a preferred road quality for the route 100. Here, the road quality is independent of the road category. This is advantageous since, for example, a very well-made unsurfaced road can have better road quality as regards road excitations that affect vehicles than an asphalted road in need of repairs.

If the default value indicates that a good road quality is desired, then, according to an example embodiment, the second route segment 112 is chosen between the first node 106 and the second node 108, because the condition value assigned to the second route segment 112 indicates a better road condition than the condition value assigned to the first route segment 110. In the example embodiment illustrated, the first route segment 110 and the second route segment 112 are of approximately the same length, so that by selecting the second route segment 112 there is no disadvantage in terms of the distance to be driven. If the second route segment 112 were considerably longer than the first route segment 110, for example if the ratio between the second route segment 112 and the first route segment 110 were to exceed a predetermined threshold value, then in an example embodiment, the first route segment 110 would be chosen instead of the second route segment 112 despite the poorer road condition. According to a further example embodiment, the first route segment 110 would also be chosen instead of the second route segment 112 if the second route segment 112 entailed a substantially longer driving time than the first route segment 110. For example, the first route segment 110 can be chosen if a ratio between a driving time assumed for the second route segment 112 and a driving time assumed for the first route segment 110 exceeds a predetermined threshold value relating to driving time.

According to an example embodiment, between the starting point 102 and the first node 106 and also between the second node 108 and the end point 104 there is no possibility of choosing between different route segments, or a possible alternative route segment would entail disregarding a further route criterion specified for the route. This would be, for example, the case if, as the said further route criterion a driving distance as short as possible is chosen, whereas an alternative possible route segment would entail a considerable detour.

Figure 2:
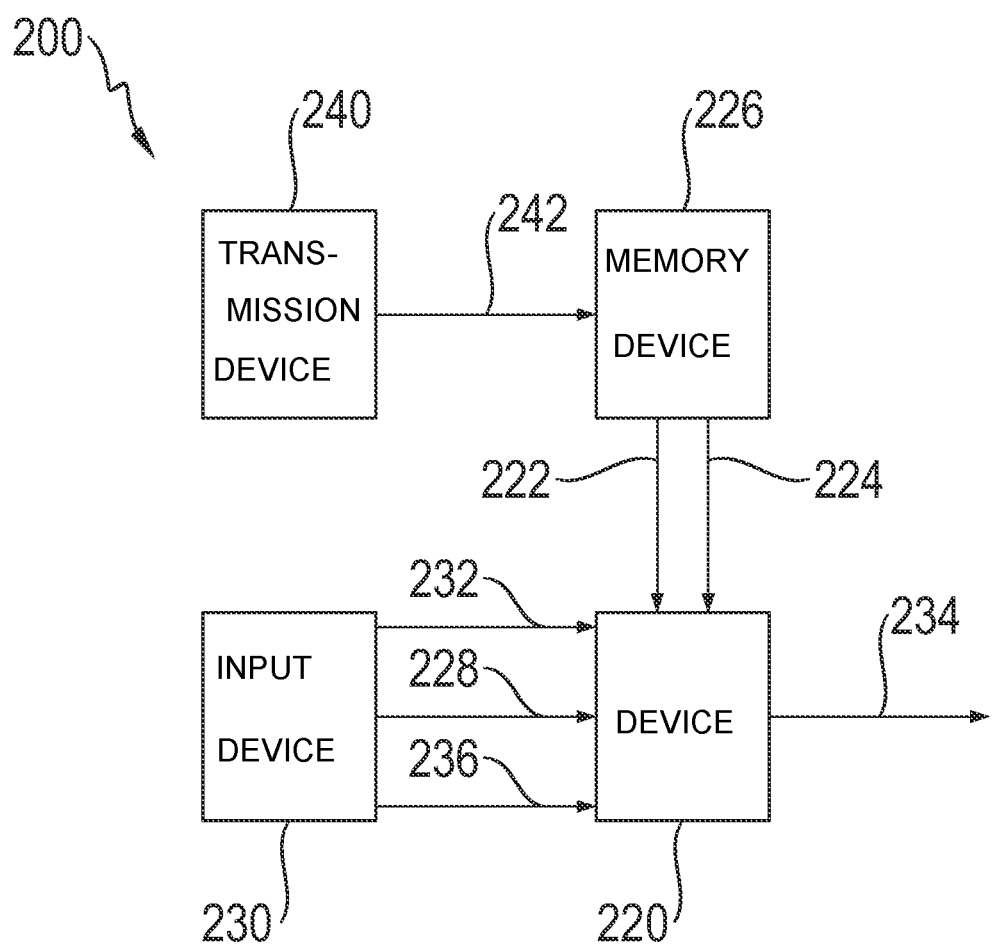
FIG. 2: A device for determining a route for a vehicle, according to an example embodiment.

FIG. 2 shows a device 200 for determining a route for a vehicle, in accordance with an example embodiment. The device 200 can be, for example, used to determine the route described with reference to FIG. 1. The device 200 comprises a selector device 220. The selector device 220 is designed to select at least one route segment 222 for the route. According to an example embodiment, for this the selector device 220 is designed to read out the route segment 222 together with a condition value 224 assigned to the route segment 222 from a digital map, which is stored for example in a memory device 226. According to various example embodiments a wireless or conductor-based interface is arranged between the selector device 220 and the memory device 226. With a wireless design of the interface, for example the selector device 220 can be arranged in a vehicle and the memory device 226 externally to the vehicle, for example in a Cloud. The selector device 220 is designed, when selecting the route segment 222, to take into account a default value 228 assigned to the route. In an example embodiment, the selector device 220 is designed to read in the default value 228 from an input device 230, which device can be, for example, operated by an occupant of a vehicle. The condition value 224 and the default value 228 can be values as described with reference to FIG. 1.

For conventional mobility but precisely also with a view to autonomous driving, comfort for the occupants in the passenger compartment of a vehicle is becoming increasingly important. For example, by way of the input device 230, the driver of a vehicle can select an operating mode which, in calculating a route, can also take into account the quality of the road condition and can thus, if appropriate, prefer a marginally longer route with better road conditions compared with a shorter route with worse road conditions. By selecting such an operating mode, for example the default value 228 is set to a value that corresponds to the said operating mode and this is taken into account when choosing the route segments. This increases the driver's comfort and reduces the stresses caused by road excitations on the vehicle.

According to an example embodiment, the selector device 220 is also designed to read in route specifications 232 that define a starting point and an end point of the route via an interface to the input device 230. Thus, the starting point and the end point can also be specified by an occupant of the vehicle. The selector device 220 is designed, using the route specifications, to read out potential route segments such as the route segment 222 from the memory device 226 and, using the default value 228, to check the suitability of using that route segment for the route. For this, the selector device 220 is for example designed to compare the condition values assigned to the potential route segments with the default value 228. For that purpose, a suitable comparison protocol can be used. For example, the condition values can be compared individually with the default value 228 in order to limit the number of potential route segments. In an alternative example embodiment, the selector device 220 is designed to read out those route segments, exclusively or preferentially from the memory device 226, which fulfill the default value 228.

The device 200 is designed to output the route data 234 that define the route. For example, the route data 234 define node points that lie on the route, and the paths that connect the node points in the form of route segments as described with reference to FIG. 1. If the route segment 222 fulfills the default value 228, the route data 234 can for example include the data that define the route segment 222.

According to an example embodiment, the selector device 220 is designed, when selecting the route segment 222, to carry out a comparison between the condition value 224 and the default value 228. The route segment 222 is selected for the route if the result of the comparison shows that the condition value 224 assigned to the route segment 222 corresponds to the default value 228. If the condition value 224 does not correspond to the default value 228, in particular if the condition value 224 indicates a road condition which is worse than the preferred road quality, the route segment 222 can still be chosen when no alternative route segment is available.

In an example embodiment, the selector device 220 is also designed to check the suitability of the route segment 222 in relation to at least one further route criterion 236. The further route criterion 236 defines for example that a driving distance or a driving time of the route should be a minimum. According to an example embodiment, the selector device 220 is designed to read the route criterion 236 into the input device 230 via the interface. Thus, the further route criterion 236 can also be specified by an occupant of the vehicle.

Alternatively, the input device 230 is an interface with a driving assistance system of the vehicle, so that the default value 228, the route data 234 and/or the route criterion 236 can be supplied automatically to the selector device 220.

According to an example embodiment, the device 220 optionally comprises a transmission device 240 which is designed to transmit sensor data that represent road excitations, together with position data, to the memory device 226. In this case, the position data represent a position of the vehicle at which the sensor data were captured. For example, the sensor data and the position data can be transmitted in the form of road condition data 242. In that case the memory device 226 is designed, for example, to adjust or update the condition value of a stored route segment to which the position data apply, using the road condition data 242. According to an example embodiment, the device 200 further comprises one or more suitable detection devices in order to detect the road excitations that act upon the vehicle, and/or the position data. A detection device for detecting a road excitation can be, for example, a chassis sensor which, for example, can detect an acceleration or a movement of part of a vehicle.

According to an example embodiment, the selector device 220 and the transmission device 240 are arranged in one and the same vehicle whereas the memory device 226 is arranged externally to the vehicle. Alternatively, the selector device 220 and the transmission device 240 can be arranged in different vehicles, so that the vehicle with the transmission device 240 is used to supply and update, for example, the data stored in the memory device 226 and the vehicle with the selector device 220 can use the data stored in the memory device 226 for route-determining purposes.

Figure 3:
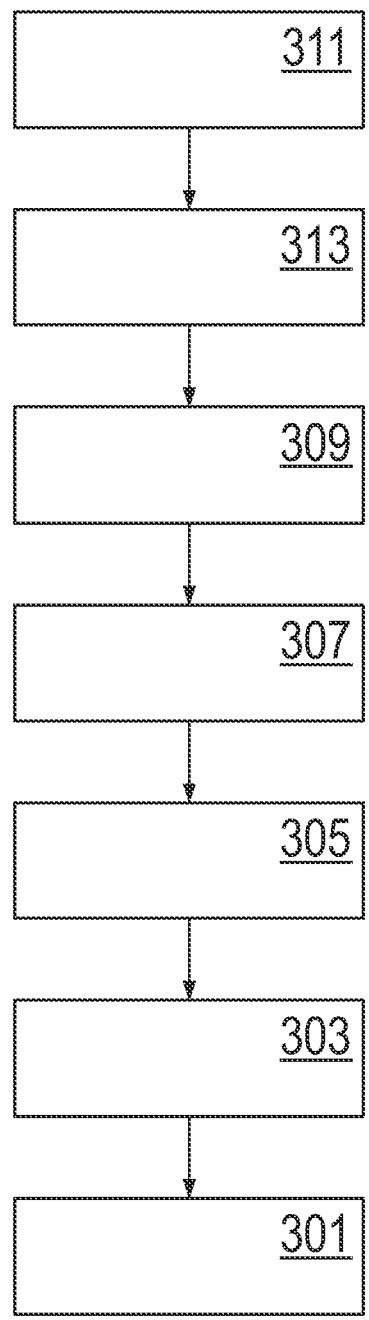
FIG. 3: A flow chart of a method for determining a route for a vehicle, according to an example embodiment.

FIG. 3 shows a flow chart of a method for determining a route for a vehicle, according to an example embodiment. The method can be carried out for example using equipment of the device described with reference to FIG. 2.

The method comprises a step 301, in which a route segment of the route is selected using a condition value assigned to the route segment and a default value assigned to the route. The condition value and the default value are values as already described with reference to the previous figures. In an example embodiment, in a step 303, a comparison is carried out between the condition value and the default value, and the choice in step 301 is made using a comparison outcome of the comparison carried out in step 303. Optionally, in step 303 the condition values of a number of potential route segments can be compared with the default value, and the comparison resulting therefrom can be used in step 303 to select the most suitable route segment from the said number of potential route segments.

In an optional step 305 the condition value or values together with the corresponding route segment or segments are read in. In this, a condition value and a route segment can be map data stored in a digital map. In an optional step 307 the default value is read in, for example, by way of a man-machine interface. Optionally, in a step 309 a further route criterion is read in, which represents a further preference for selecting a route segment in addition to the default value. Thus, the said further route criterion can also be taken into account in step 301 when selecting the route segment, and/or in step 303. A weighting ratio with which the default value and the further route criterion can influence the choice of the route segment, can be predefined or specified by a user together with the default value and the route criterion.

In an optional step 311 a condition value is determined using sensor data which represent data captured by sensors on a chassis of a vehicle. In a step 313 the condition value determined in step 311 is assigned to a route segment using position data. In this case the position data consist of data determined by a position-determining device of the vehicle. The route segment and the condition value can then be read into step 305.

In particular, steps 301, 303 and 305 can be carried out repeatedly during the determination of a route, in order to select a plurality of route segments which are then combined to form the route.

Figure 4:
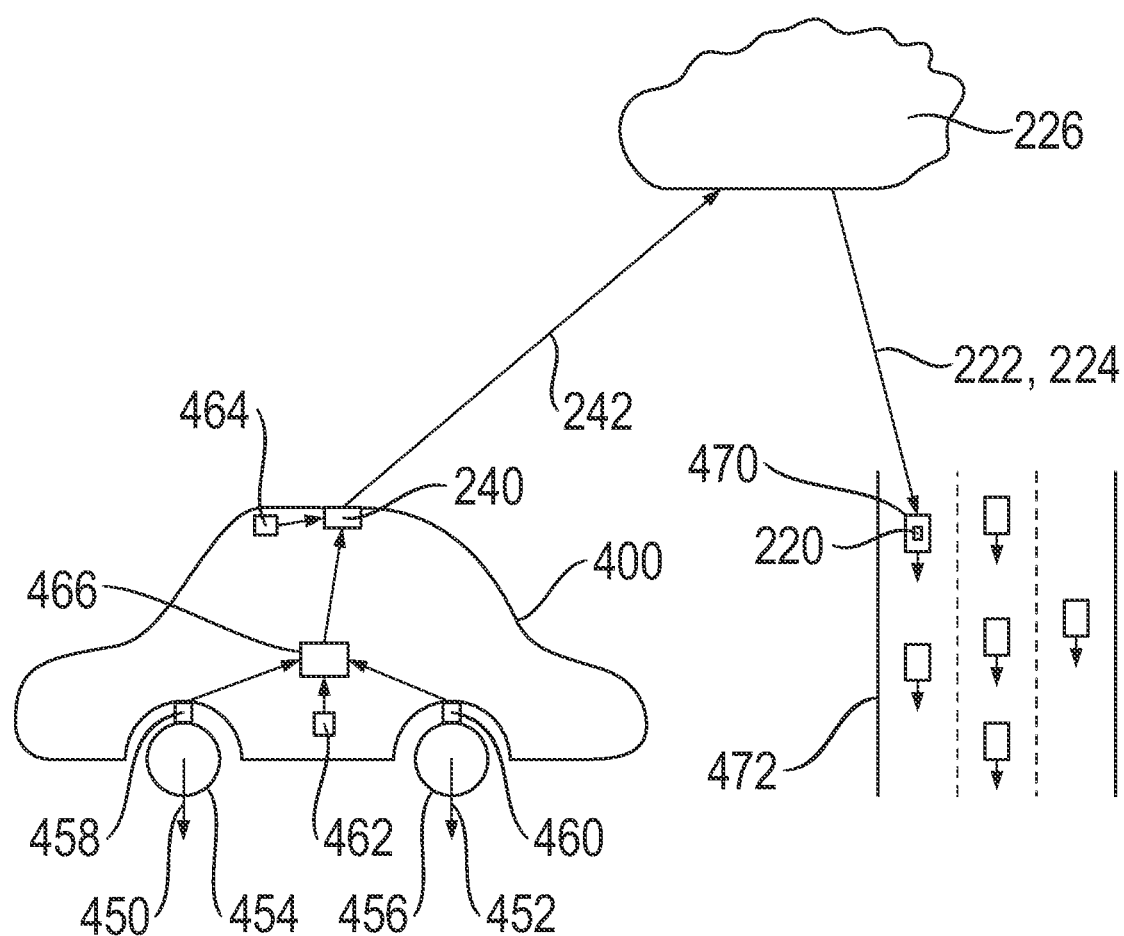
FIG. 4: An application scenario for a method for determining a route for a vehicle, according to an example embodiment.

FIG. 4 shows an application scenario of a method for determining a route, according to an example embodiment. In this case a method as described with reference to FIG. 3 can be carried out.

The figure shows a vehicle 400 upon which road excitations act while the vehicle is driving along a road. The effects of the road excitations are represented purely schematically by wheel movements 450, 452 of wheels 454, 456 of the vehicle 400. The road excitations, from which conclusions about the road condition emerge, are detected using a suitable sensor system of the vehicle 400. For example, for that purpose wheel acceleration sensors 458, 460 associated with the wheels 454, 456 and an inertial sensor 462 arranged on a vehicle body of the vehicle are shown. For example, one can have recourse to the sensors of a chassis sensor system of a chassis of the vehicle 400. Furthermore, the vehicle 400 has a position-determining device 464 and a transmission device 240. The position-determining device 464 is designed to determine a current position of the vehicle 400 and supply it to the transmission device 240. The transmission device 240 is designed to transmit road condition data 242 to a memory device 226, which for example can be implemented in a Cloud. According to an example embodiment, the road condition data 242 include position-determination data supplied by the position-determining device 464 and sensor data supplied by the sensors 458, 460, 462. Thus, the road condition data 242 provide data about the condition of the road. In an example embodiment, the vehicle 400 has a collecting device 466 which, according to an example embodiment, is designed to collect the sensor data supplied by the sensors 458, 460, 462 and, in collected form, to supply those data in an already combined form to the transmission device 240 for transmission in the form of road condition data 242. In particular, the collecting device 466 is designed to generate an accumulation of data from the road excitations acting upon the vehicle 400.

The memory device 226 is designed to use the road condition data 242 to draw up or update a digital map. For example, the memory device 226 is designed to update a condition value of a route segment that pictures the road on which the vehicle 400 is driving at the time, using the road condition data 242. For that purpose, the memory device 226 can comprise a suitable logic system. The memory device 226, for example in the form of a data Cloud, is designed to store all the collected information from vehicle 400 about the road conditions of the road network.

According to an example embodiment, the memory device 226 is designed to supply stored route segments together with the road condition values associated with the said route segments, or to use them in order to determine a route for the vehicle 400 or for a further vehicle 470. Thus, using the memory device 226 the stored data can be supplied to fleets of vehicles to be taken into account when an optimum and, in particular, comfort-related route guide is being prepared for the navigation system.

FIG. 4 shows a road with three lanes, on which a number of vehicles are driving, among them also the said further vehicle 470. According to the example embodiment shown, the further vehicle 470 uses the data stored in the memory device 226 to determine a route. For that purpose, the further vehicle 470 comprises a selector device 220 as described, for example, with reference to FIG. 2. The selector device 220 is designed, for example, to receive a route segment 222 and a condition value 224 associated with the said route segment 222 from the memory device 226 and to determine a route to be driven by the further vehicle 470.

The approach described enables road conditions to be taken into account when the route is being calculated by the navigation system of the vehicle, for example the further vehicle 470.

According to an example embodiment, data required for this are taken up by the collecting device 466 in the form of chassis control sensors, and evaluated. In doing this, for example, the road excitations of all the relevant sensors on the chassis are recorded and evaluated. As a follow-up, these are bunched together in a defined format that includes a current position of the vehicle, for example a GPS position, and uploaded in real time by way of a mobile data communication system into the memory device 226, for example in the form of a special data Cloud. The memory device 226 stores the collected information from a plurality of vehicles 400 of that type which are connected to the memory device 226, and from that information generates a digital road map with the associated road conditions. In turn, these data are supplied via the mobile data communication system to the respective vehicles 470, so that the integrated navigation system of the said vehicle 470 can take into account of, or use that information for route guiding or selecting a route.

According to an example embodiment, the digital road maps with the road conditions are also made available to other institutions, for example road maintenance departments, so that for example they can assess the need for renewal and/or repair of roads directly and in real time. This can eliminate the need for road checks by the road maintenance departments. According to an example embodiment, for that purpose the memory device 226 has a suitable interface which enables an institution of that type to access the data stored in the memory device 226. Alternatively, the memory device 226 is designed to communicate changes that affect a route segment, via such an interface, directly to an institution of that type.

According to an example embodiment, the approach described on the one hand makes use of chassis sensor systems already present, and on the other hand enables the information obtained to be processed and taken into account for other purposes. For this a chassis controller can be used, by means of which data captured by sensors on the chassis, which among other things can yield information about road conditions, can be evaluated and also communicated. Thus, for example, such a chassis controller can include the functions of the collecting device shown in FIG. 4 and if necessary, also the functions of the transmission device 464.

The data collected are for example used by a navigation system to calculate a route on the basis of road guidance and traffic information, and additionally on the basis of the quality of the roads. In light of growing demands for comfort, but for example also with a view to autonomous driving, information about road quality can also be incorporated into route calculation, so as to increase comfort for the occupants of a vehicle and reduce the stresses on the chassis. For that, for example all the road information captured by sensors, for example including GPS data, is evaluated by the chassis controller and uploaded to the memory device 226, for example in the form of a data Cloud. There, the information from several vehicles 400 is stored in order to generate a digital road map with associated road conditions. In turn, that information can be used by way of data communication systems for route calculations. As a further application, the information can also be supplied to road maintenance department, for example, with a view to carrying out road renovations.

If an example embodiment contains an "and/or" link between a first feature and a second feature, this can be read to mean that the example embodiment, in one version, allows both the first and the second feature, while in another version it allows either only the first feature or only the second feature.

INDEXES

100 Route
102 Starting point
104 End point
106 First node
108 Second node
110 First route segment
112 Second route segment
200 Device
220 Selector device
222 Route segment
224 Condition value
226 Memory device
228 Default value
230 Input device
232 Route specification
234 Route data
236 Route criterion
240 Transmission device
242 Road condition data
301 Selection step
303 Comparison step
305 Step of reading in a condition value and a route segment
307 Step of reading in a default value
309 Step of reading in a route criterion
311 Determination step
313 Assignment step
400 Vehicle
450, 452 Wheel movements
454, 456 Wheels
458, 460 Wheel acceleration sensors
462 Inertial sensor
464 Position-determining device
470 Further vehicle
472 Road

The invention claimed is:

1. A method for determining a route for a vehicle, the route extending from a start point to an end point and having a route segment that extends between the start and the end points of the route, the method comprising: initiating determination of the route when a default value is input into an input device by a user, the default value being associated with the route and representing a preferred road quality of the route, associating the route segment with a condition value, the condition value representing a road condition of the route segment, selecting the route segment with a selector device taking into account the condition value associated with the route segment and the default value associated with the route, wherein the default value is independent of a road category.

2. The method according to claim 1, further comprising, during the selection of the route segment, taking the condition value and the default value by comparing the condition value with the default value.

3. The method according to claim 1, further comprising, during the selection, choosing the route segment from a plurality of route segments, wherein the plurality of route segments comprises a first route segment and at least one second route segment alternative to the first route segment, assigning a first condition value to the first route segment, which represents a road condition of the first route segment, and assigning a second condition value to the second route segment, which represents a road condition of the second route segment, and comparing the first condition value, the second condition value and the default value when selecting the route segment.

4. The method according to claim 3, further comprising choosing the first route segment as the route segment when the road condition represented by the first condition value is closer to the road quality represented by the default value than is the road condition represented by the second condition value, and choosing the second route segment as the route segment when the road condition represented by the second condition value is closer to the road quality represented by the default value than is the road condition represented by the first condition value.

5. The method according to claim 3, further comprising, taking into account a length of the first route segment and a length of the second route segment when selecting the route segment.

6. The method according to claim 1, further comprising reading the route segment and the condition value out from a memory device via a wireless interface.

7. The method according to claim 1, further comprising reading the default value via an input device.

8. The method according to claim 1, further comprising determining the condition value using sensor data that represent data captured by sensors arranged on a chassis of a vehicle, and assigning the condition value to the route segment using position data, wherein the position data represent data determined by a position-determining device of the vehicle.

9. A device for determining a route for a vehicle according to the method of claim 1, wherein the device comprises a selector device which is designed, when selecting a route segment of the route, to take into account a condition value assigned to the route segment and a default value associated with the route, and the condition value represents a road condition of the route segment and the default value represents a road quality that is preferred for the route and is independent of a road category.

10. A computer program product with program code for carrying out the method of determining a route for a vehicle when the program product is run on a device according to claim 9.

\* \* \* \* \*